United States Patent
Sato

(10) Patent No.: US 6,538,999 B1
(45) Date of Patent: Mar. 25, 2003

(54) PID FILTER CIRCUIT AND FIFO CIRCUIT

(75) Inventor: Shinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/243,551

(22) Filed: Feb. 3, 1999

(30) Foreign Application Priority Data

Feb. 20, 1998 (JP) .......................................... 10-038866

(51) Int. Cl.$^7$ .............................................. G01R 31/08
(52) U.S. Cl. ...................................... 370/252; 370/465
(58) Field of Search ................................ 370/252, 241, 370/464, 428, 497, 465, 506, 503, 535, 468; 348/423, 467, 714, 469

(56) References Cited

U.S. PATENT DOCUMENTS

| | | | |
|---|---|---|---|
| 5,898,695 A | * 4/1999 | Fujii | 370/464 |
| 5,920,572 A | * 7/1999 | Washington | |
| 5,966,385 A | * 10/1999 | Fujii | 370/465 |
| 5,991,503 A | * 11/1999 | Miyasaki | 386/111 |
| 6,002,687 A | * 12/1999 | Magee | |
| 6,185,228 B1 | 2/2001 | Takashimizu et al. | 370/535 |
| 6,208,643 B1 | * 3/2001 | Dieterich | 370/389 |
| 6,359,911 B1 | * 3/2002 | Movshovich | 370/356 |

FOREIGN PATENT DOCUMENTS

| | | |
|---|---|---|
| EP | 0796018 | 9/1997 |
| JP | 3-24844 | 2/1991 |
| JP | 4-342336 | 11/1992 |
| JP | 9-307865 | 11/1997 |
| JP | 10-290207 | 10/1998 |
| JP | 11-55315 | 2/1999 |

* cited by examiner

Primary Examiner—Douglas Olms
Assistant Examiner—Ricardo M. Pizarro
(74) Attorney, Agent, or Firm—Foley & Lardner

(57) ABSTRACT

A PID (Packet Identifier) filter circuit includes a FIFO (First-in, First-out) memory. Filtering may be performed irrespective of the length of the PID and irrespective of whether the position of the PID is fixed in the packet. The circuit includes a comparison value table for storing therein comparison values, and a comparator for taking comparison values successively from the comparison value table and for comparing value of the PID in the input packet data with the comparison values on a word by word basis. A FIFO memory stores input packet data. The FIFO memory does not implement a read operation until the input packet data is determined to contain desired data based on its PID. If the input packet data is determined not to contain desired data, any portion of the input packet data already stored in the FIFO is superseded.

8 Claims, 6 Drawing Sheets

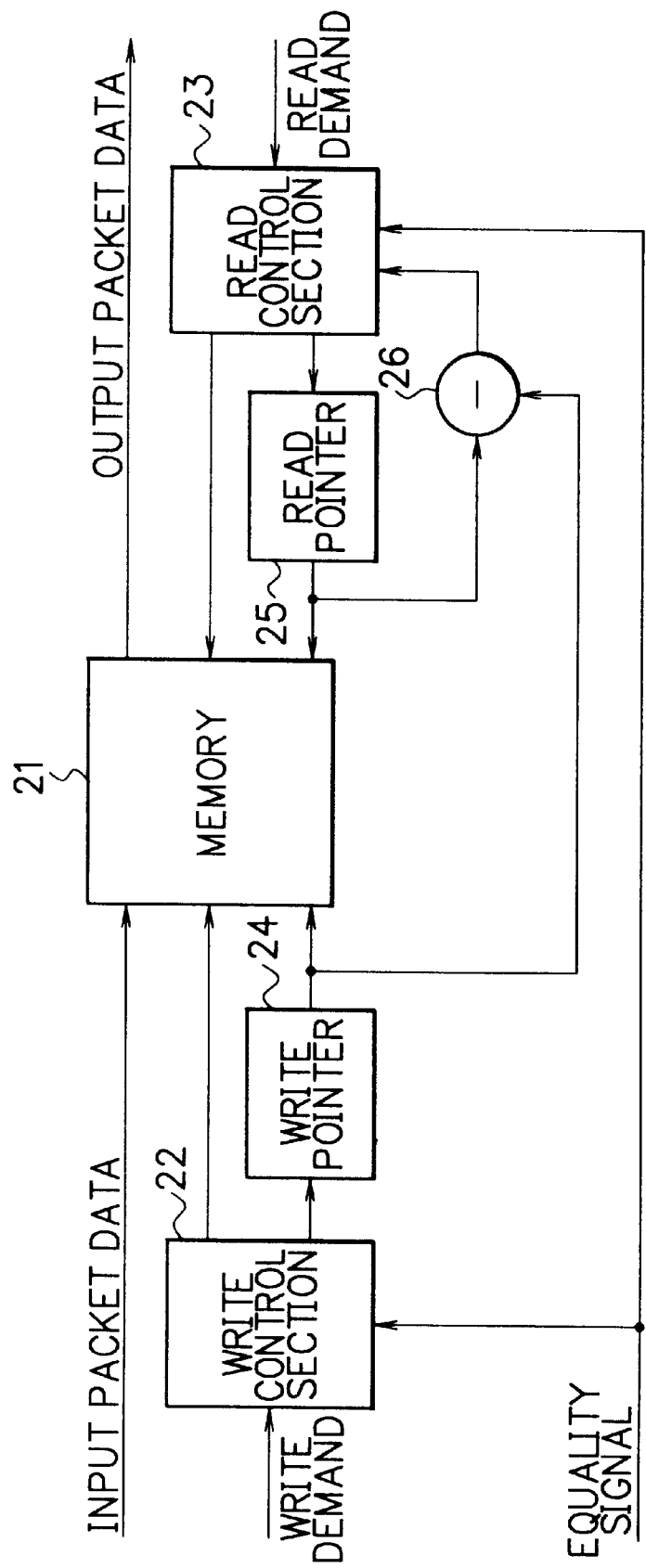
F I G. 5

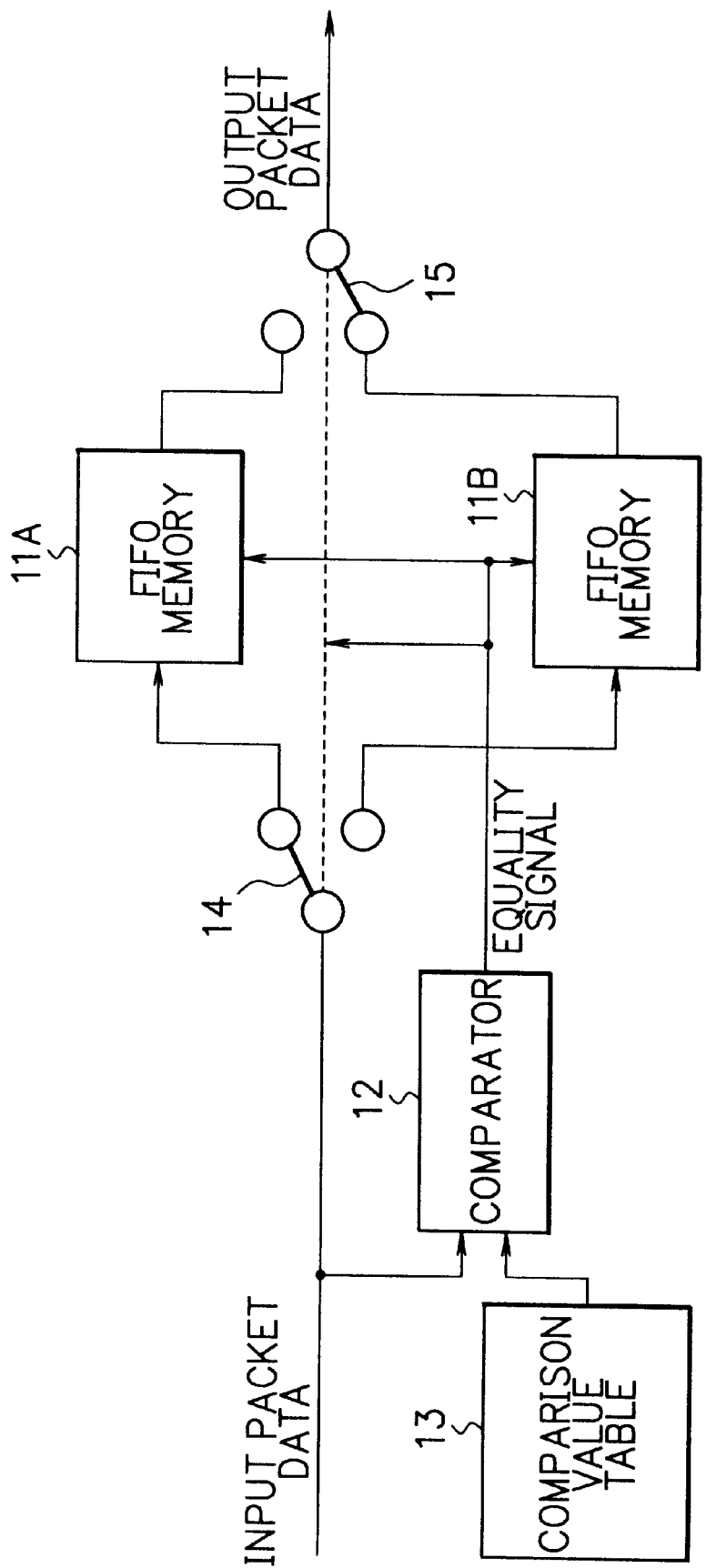

PID FILTER CIRCUIT AND FIFO CIRCUIT

BACKGROUND OF THE INVENTION

The present invention relates to a filter circuit for selecting packets from among a plurality of packets of a time division multiplexed data stream. More particularly this invention relates to a filter circuit for selecting packets based on the PID (packet identifier) incorporated in the packet, and to a FIFO (first-in first-out) memory used in the filter circuit.

DESCRIPTION OF THE PRIOR ART

A plurality of types of data may be transmitted in a single data stream as individual time division multiplexed packets. Each packet includes a packet identifier (PID) that denotes the type of data that the packet contains. When the packet is received, the PID may be used to determine whether the packet contains a desired type of data.

The well-known MPEG 2 (Moving Picture Experts Group 2) audio/video/data compression standard uses time division multiplexed data packets. Each TS (Transport Stream) packet has a fixed length of 188 bytes as shown in FIG. 1. The PID is thirteen bits long and is located twelve bits from the beginning of the packet.

In some cases, the position of the PID within a packet is not fixed. In the packet shown in FIG. 2, the position of the PID is not fixed within the packet. In such instances, the packet includes a pointer that indicates the location of the PID. In the example shown in FIG. 2, the pointer is located at the beginning of the packet.

In a system using time division multiplexed packets, the receiving side determines whether a received packet contains a desired type of data based on the packet ID. This process is implemented by a filter circuit that samples packets having predetermined PIDs from the packet stream.

FIG. 3 is a block diagram showing one example of a configuration of a conventional PID filter circuit. In the example of FIG. 3, the PID has a length of three words.

The filter circuit includes flip-flops (FF) 61 to 63 that delay the input packet data by a length of three words. An output of the flip-flop 63 of the last stage is provided to a FIFO (First-in First-out) memory 60 for implementing first-in first-out storage of the received packet data. Further, the outputs of the flip-flops 61 to 63 are provided to respective comparators 64 to 66 that compare the inputs from the flip-flops with predetermined data. The outputs of the respective comparators 64 to 66 are inputted to a three input AND gate 67, and the output of the AND gate controls the writing of data in the FIFO.

The PID filter circuit of FIG. 3 operates as follows. The respective flip-flops 61 to 63 delay the input data by one word. The comparator 64, the comparator 65 and the comparator 66 perform a comparison on respective sequential words of the received data. Therefore three continuous words are simultaneously delayed by the flip-flops 61 to 63 and three continuous words are compared by the comparators 64 to 66 at the same time. When the three words that constitute the PID of the received data are received by the comparators and are found to be the same as the predetermined PID words, the comparator provides an appropriate signal to the AND gate 67 and the output of the AND gate 67 is used as a control signal to enable writing of the input packet into the FIFO memory 60.

However, the conventional circuit of FIG. 1 suffers from the problems described below.

Figure First, the example of FIG. 3 is designed to operate only on a PID having a fixed length of three words. To operate on data having PIDs that are five words in length, five flip-flops and five comparators would be required. Furthermore, the circuit cannot use a simple two input AND gate since the number of inputs to the AND gate depends on the number of words in the PID. Therefore a complicated circuit is required.

Second, the example of FIG. 3 requires that the position of the PID within the packet data is fixed. In the example shown in FIG. 3, it is necessary for the PID to be located at the beginning of the packet data, in order to provide the correct data to the comparators and hence to store desired packets in the FIFO memory 60. For instance, if the PID begins at the third word of the packet, it is necessary to provide two additional flip-flops in between the flip-flop 63 and the FIFO memory 60. Furthermore, the PID must be provided at the same position in each packet, and therefore the circuit of FIG. 3 cannot be used where the position of the PID is variable.

Thus the operation of the conventional circuit depends upon the PID having a fixed length and a fixed position within the packet.

SUMMARY OF THE INVENTION

In view of the foregoing, it is an object of the present invention to provide a PID filter circuit which may be configured to operate on PIDs having varying lengths and having varying positions within the packet data, and which includes a FIFO memory.

According to a first aspect of the present invention, in order to achieve the above-mentioned object, there is provided a PID filter circuit for implementing a filtering of packet data on the basis of PIDs (Packet Identifiers). The PID filter circuit includes a comparison value table for storing therein a comparison value that is used to identify PIDs, and a comparator for determining the stored position of a PID within an input packet, for reading words of a comparison value successively from the comparison value table, and for comparing the words of the PID of the input packet with words of the comparison value taken from the comparison value table on a word by word basis.

According to a second aspect of the present invention, a PID filter circuit includes a FIFO (First-in, First-out) memory for storing input packet data. The FIFO memory does not execute a read operation for an input packet until the input packet is determined to be desired data by the comparator, and when input packet data is determined not to be desired data by the comparator, the input packet data is cleared from the comparator.

According to a third aspect of the present invention, a PID filter circuit includes first and second FIFO (First-in First-out) memories for storing input packet data, a first switch for switching input packet data to one of the first and the second FIFO memories, and a second switch for switching output of packet data to the FIFO that is not selected by the first switch. When data is inputted to either one of the FIFO memories, data is outputted from the other of the FIFO memories. When an inputted packet stored in one FIFO memory is determined to be desired based on comparison of the PID of the packet by the comparator, the PID filter circuit causes that data to be outputted from the FIFO memory in which it is stored by changing the switches, thereby routing next input data to the other FIFO memory.

According to a fourth aspect of the present invention, there is provided a FIFO circuit including a FIFO memory for storing input data, the FIFO memory comprising a dual port memory that is capable of executing a write operation and a read operation independently. A write pointer maintains a write address for the dual port memory, and a read pointer maintains a read address for the dual port memory. A write control section increments the value of the write pointer when data is written, and if the comparator subsequently provides a control signal indicating that the input data is not desired, the write control section decrements the value of the write pointer in accordance with the quantity of the data already stored so that future data can be written over the undesired data. A read control section increments the value of the read pointer when data is read out. The FIFO does not respond to a read demand if the difference between the read pointer and the write pointer is less than a predetermined amount.

As stated above, the PID filter circuit according to the invention stores comparison values in the comparison value table, and the comparator reads words of the comparison values from the comparison value table successively and compares those values word by word with the PID of an input data packet. For that reason, if the length of the PID is long, the comparison value table can store values for comparison to successive sections of the PID, thus still requiring only one comparator.

In the configuration in which the FIFO memory is provided, input packet data is stored in the FIFO memory and is maintained in the FIFO memory until it is determined whether the input packet is desired. If the input packet data is not desired, it is superseded in response to the output of the comparator. For that reason, even if the PID within the packet data does not have a fixed position, the circuit can provide packet filtering without changing the circuit configuration.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 5 is a block diagram showing the configuration of a FIFO memory in accordance with the preferred embodiment; and FIG. 6 is a block diagram showing the configuration of a PID filter circuit of an alternative embodiment of the invention.

DETAILED DESCRIPTION OF THE PREFERRED EMBODIMENTS

Figure 1:
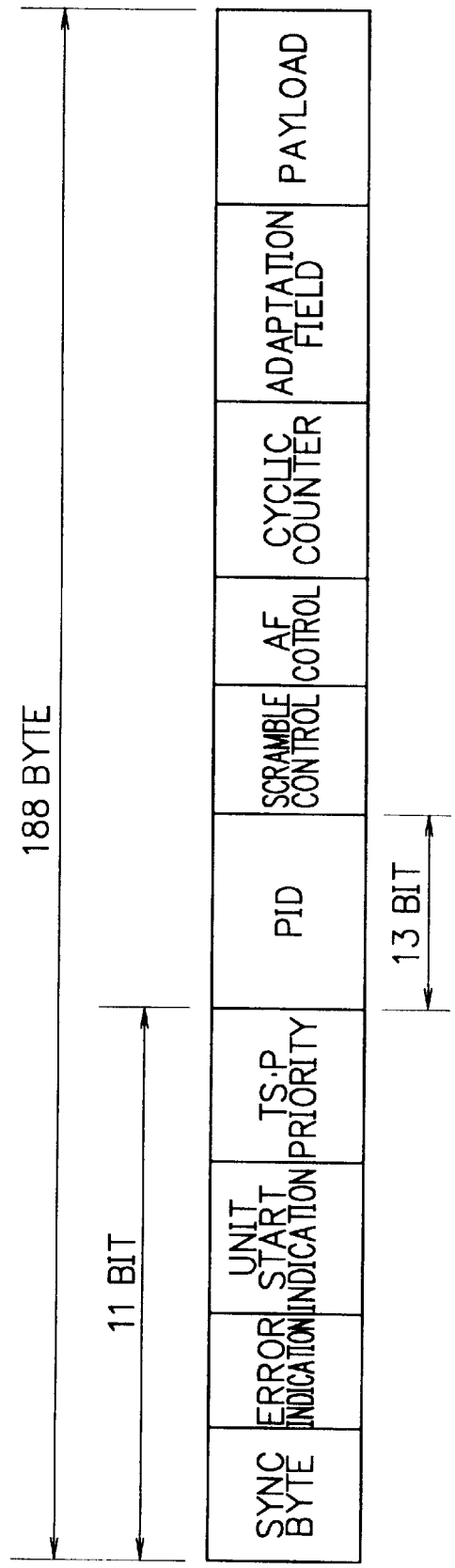
FIG. 1 is a view showing a configuration of TS (Transport Stream) packets in accordance with the MPEG 2 (Moving Picture Experts Group 2) standard.
Figure 2:
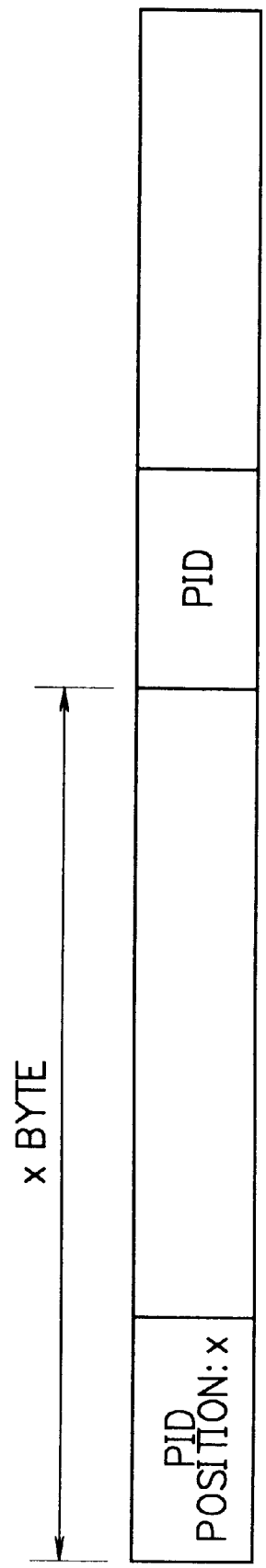
FIG. 2 is a view showing one example of a packet having a variable PID (Packet identifier) position.
Figure 3:
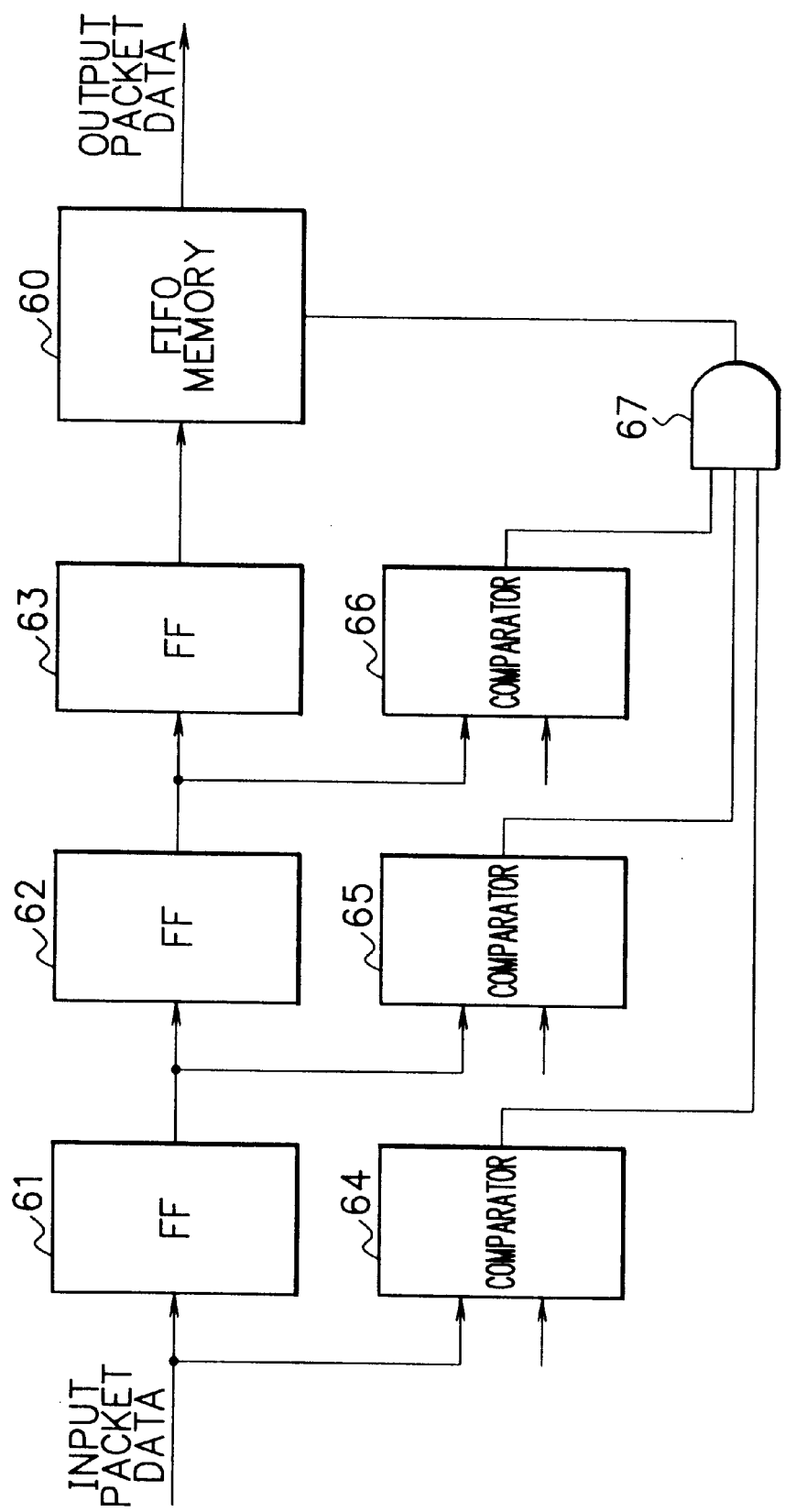
FIG. 3 is a block diagram showing the configuration of a conventional PID filter circuit.
Figure 4:
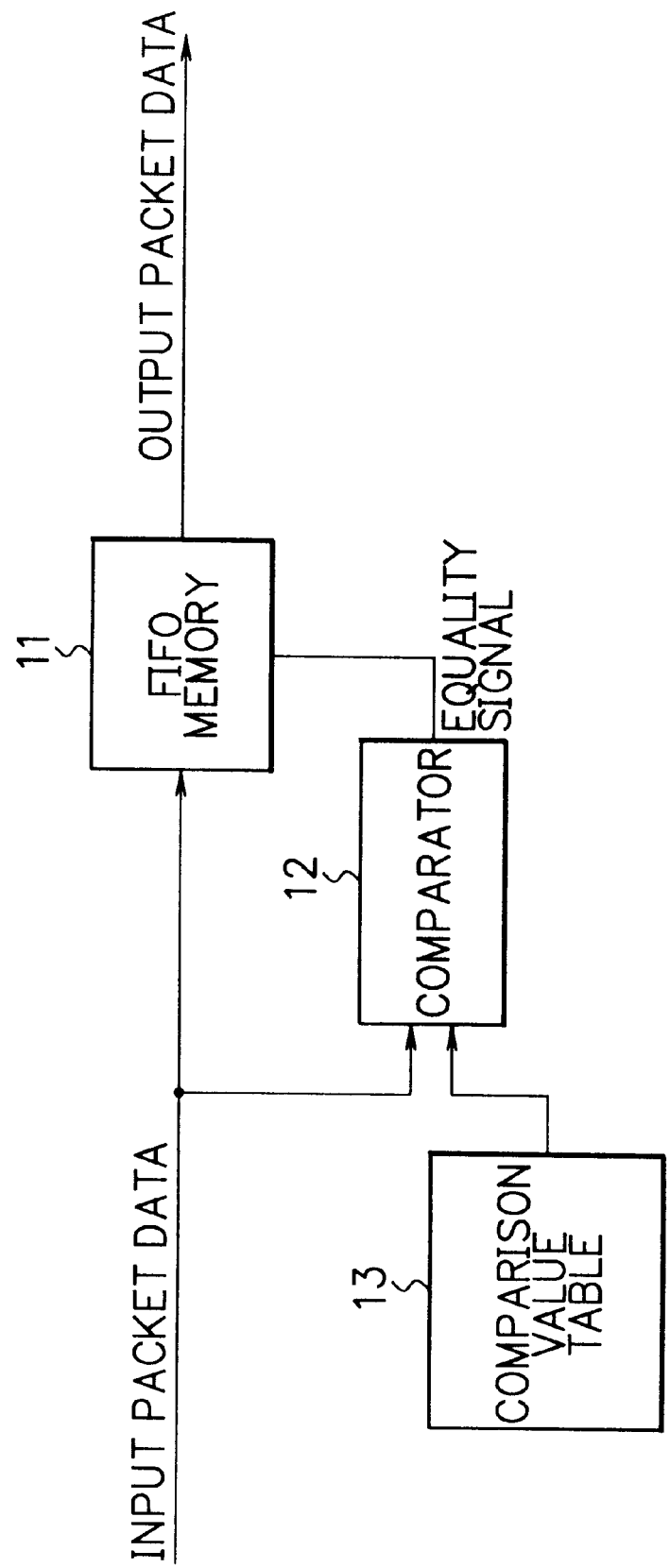
FIG. 4 is a block diagram showing the configuration of a PID filter circuit of a preferred embodiment of the invention.

A preferred embodiment of the present invention will be described in detail in accordance with the accompanying drawings. FIG. 4 is a block diagram showing a configuration of a PID filter circuit of a preferred embodiment of the invention, and FIG. 5 is a block diagram showing an internal configuration of a FIFO memory.

The PID filter circuit shown in FIG. 4 is provided with a FIFO memory 11 that stores input packet data and provides output packet data, a comparator 12 for comparing data of respective words of respective packets of the input packet data, and a comparison value table 13 for storing therein comparison value data that is used for comparison to input packet data in the comparator 12. The FIFO memory 11 stores input packet data in response to an external a write demand signal, and the FIFO memory 11 outputs packet data in response to the combination of an external read demand from the external side and a signal from the comparator 12. The FIFO memory 11 also clears input data within the FIFO memory 11 in response to the signal from the comparator 12. The input packet data is initially written to the FIFO memory without alteration. The comparison value table 13 is constituted by memory, and the comparator 12 specifies a word order of the PID to be detected such that the comparison value table 13 outputs words of comparison values in accordance with the specified word order.

Next, there is described an internal configuration of the FIFO memory 11 using Figure FIG. 5. The FIFO memory 11 includes a dual port memory 21 that stores the packet data. The memory 21 is capable of executing a write operation and a read operation independently. The FIFO memory 11 is further provided with a write control section 22 for executing a write operation to the memory 21 in accordance with an external write demand signal, and a read control section 23 for executing a read operation from the memory 21 in accordance with an external read demand signal. A write pointer 24 maintains a next write address of the memory 21, and a read pointer 25 maintains a next read address of the memory 21. A subtracter 26 calculates a difference between the write address maintained by the write pointer 24 and the read address maintained by the read pointer 25. An output signal from the comparator 12 (FIG. 4) is provided to the write control section 22 and the read control section 23 as a control signal.

As described above, the memory 21 executes a write operation under the control of the write control section 22 and executes a read operation under the control of the read control section 23. When an external write demand signal is received, the write control section 22 commands the memory 21 to perform a write operation and increments the value of the write pointer 24. Thereafter, if the signal from the comparator indicates that the PID does not agree with the comparison value, the written packet data is to be superseded, and therefore the write control section 22 effectively clears the packet data by subtracting the quantity of data already written to the memory 21 from the value of the write pointer 24. When an external read demand signal is received, the read control section 23 commands the memory 21 to read out data so long as the signal from the comparator and the output of the subtracter 26 allow read out to occur. If the signal from the comparator does not indicate agreement between the input data and the comparison value, or if the output value of the subtracter 26 is less than the corresponding length of the packet and thus indicates that there is less than a complete packet of unread data available in the memory 21, the read control section 23 does not execute the read operation regardless of existence of the read demand.

Next, there will be described operation of the PID filter circuit. A fundamental operation of the PID filter circuit is that when an input packet is received, it is written to the FIFO memory 11, and at the same time, the comparator 12 compares the received data with the comparison value read out from the comparison value table 13. The single comparator 12 is used for the comparison regardless of word length of the PID or its position within the packet. When the length of the PID is more than the corresponding length of the comparator, the comparison value is read from the comparison value table 13 in successive portions, thus executing comparison successively. Furthermore, the FIFO memory 11 does not output packets while the comparator 12 is performing the comparison despite a read demand. When the result of comparison indicated by the output signal of the comparator indicates disagreement, the packet data of the compared packet written into the memory during the comparison is superseded in the FIFO memory 11 through adjustment of the write pointer as described above. Through this manner of operation, the circuit of the present embodiment operates as a packet ID (PID) filter.

Hereinafter, there will be described operation of the PID filter circuit further in detail.

Each packet of the input packet data contains a unique PID. Therefore the comparison value table 13 stores predetermined PIDs of desired packets prior to performing the packet filtering process. When the PID section of an input data packet is received, the comparator 12 reads out a PID from the comparison value table 13 and compares that PID to the PID of the input data packet.

In general, the FIFO memory implements a read operation in response to a read demand if data remains within the FIFO memory, but does not implement a read operation if data does not remain within the FIFO memory. In the case of the present PID circuit, it is not known whether a current input packet data is a desired packet data while the comparator 12 is in the process of comparing the PID. Therefore, in this PID filter circuit, a read demand is implemented if there is unread data with a length of more than one packet within the FIFO memory 11, and a read demand is not implemented if there is unread data with a length of less than one packet within the FIFO memory 11. The amount of the unread data stored in the FIFO memory 11 is indicated by the output of the subtracter 26, which represents the difference between the next write address and the next read address. The PID filter circuit enables input packet data to be written to the FIFO unconditionally, but if the input packet data is determined not to be desired packet data, the input packet data already written in the FIFO memory 11 is superceded. Since any remaining data of undesired input packet data that has not yet arrived at the FIFO is not necessary, the writing of such remaining data may be prohibited on the basis of the signal from the comparator.

Next, there will be described operation of the comparator 12. The comparator 12 counts the amount of data (for instance, byte number, octet number) from the beginning of an input packet. When the position of the PID is variable and position information (a pointer) of the PID is included in the packet data, the comparator reads the pointer and uses the pointer to locate the PID. When the position of the PID is fixed, the position of the PID is established beforehand, such as by a host CPU (not illustrated). In all cases, the comparator 12 counts the data from the beginning of the input packet data to detect the position of the PID.

When the data at the position of the PID arrives, the comparator 12 compares the value of the PID with a value of the comparison value table 13. The comparator 12 obtains the first word of the comparison value from the comparison value table 13 for comparison to the first word of the PID. The comparator 12 then compares the first word of the comparison value to the first word of the PID, while obtaining the second word of the comparison value from the comparison value table 13. The comparator 12 then compares the second word of the comparison value with the second word of the PID The comparator 12 thus compares the whole PID data from the comparison value table 13 with the whole PID within the input packet data on a word by word basis. If the PID agrees completely with the comparison value, this is indicated to the FIFO memory 11 by an output signal of the comparator. In effect, the signal outputted from the comparator 12 represents either that that it is in the process of performing the comparison operation (including a waiting period during which the PID of the input packet data has not arrived at the comparator), or that the PID agrees with the comparison value, or that the PID does not agree with the comparison value.

Next, the operation of the FIFO memory 11 is described with respect to FIG. 5.

When a write demand for writing to the memory 21 is received, the write control section 22 causes the write operation to be performed. The write operation is performed with reference to the write pointer 24 as the write address, and after completion of the write operation the value of the write pointer 24 is incremented in accordance with an instruction from the write control section 22. A read operation is similarly performed in response to an external read demand. When there is a read demand, the read control section 23 causes the read operation to be performed in the memory 21. The read operation is performed with respect to the read pointer 25, and after completion of the read operation the value of the read pointer 25 is incremented in accordance with an instruction from the read control section 23. As a result, the quantity of unread data stored in the memory 21 is the difference between the value of write pointer 24 and the value of read pointer 25. When the value of the write pointer 24 equals the value of the read pointer 25, all data in the memory 21 has been read, and consequently the read control section 23 does not reply to the read demand.

When the comparator 12 (FIG. 4) is performing the comparison operation, it is not known whether the input packet data is a desired packet data. For that reason, write operations may be performed during the comparison operation. However, if at this time the difference between the write pointer 24 and the read pointer 25 is less than the length of one packet, the read control section 23 does not implement a read operation in response to the read demand. After the comparison is completed, if the data is determined to be desired data, the read control section 23 implements a read operation. In contrast, if the data is determined not to be desired data, the undesired data already written in the memory 21 is superceded by subtracting the amount of undesired data already written in the memory 21 from the value of the write pointer 24. Moreover, the write control section may be implemented such that no additional undesired data may be written into the FIFO memory 11 when the signal from the comparator after performing comparison indicates that the data is not desired data.

Thus, in the PID filter circuit of the first preferred embodiment, the comparator 12 counts the amount of data from the top of the packet data to locate the PID data in the packet to be used in the comparison operation. The comparator 12 allows the input packet data to remain within the FIFO memory 11 until it is determined whether the input packet data is desired. The input packet data stored in the FIFO is used if it is determined to be desired data, and is superseded if it is determined not to be desired data.

Therefore, even if the position of the PID within the packet data is variable, packet filtering may be implemented without changing the circuit. Furthermore, since comparison is performed successively on words of the PID in the comparator 12 while reading out comparison value words from the comparison value table 13, the comparison is performed word by word using only one comparator. Therefore, if the PID has a multiple word length, this is addressed by enlarging the comparison value table 13. Thus, differences in the word length of the PID do not require a change in the circuit scale.

FIG. 6 is a block diagram showing a configuration of a PID filter circuit according to another embodiment of the present invention. The PID filter circuit shown in figure FIG. 6 is compared with the PID filter circuit shown in figure FIG. 4. The PID filter circuit shown in FIG. 6 is provided with two FIFO memories 11A and 11B that are controlled by the signal from the comparator 12 and that receive input packet data. A switch 14 directs the input packet data to either one of the FIFO memories 11A and 11B, and a switch 15 selects an opposite one of the FIFO memories 11A and 11B for providing output data. In this connection the PID filter circuit shown in FIG. 6 differs from the PID filter circuit shown in FIG. 4. The switches 14 and 15 are interlocked so as to select different FIFO memories mutually, and are controlled by the output signal of the comparator.

In this PID filter circuit, when the switch 14 selects the FIFO memory 11A, the input packet data is written in the FIFO memory 11A, and at the same time the PID included therein is compared with a value from the comparison value table 13 by the comparator 12. Also at the same time, an output packet data is read out from the FIFO memory 11B, because the switch 15 selects the FIFO memory 11B. When the input packet data written in the FIFO memory 11B is necessary packet data, it causes the switches 14, 15 to be reversed by the output signal of the comparator, thus permitting the data read out from the FIFO memory 11A to be outputted. When the input packet data written in the FIFO memory 11A is not desired packet data, it is superseded. Therefore, even if the packet data has a variable PID position, it is capable of being filtered by this circuit.

As described above, according to the present invention, a comparison value from the comparison value table is read out and used for comparison with the input packet data, therefore, even if the word length of the PID is long, the comparison may be implemented by enlarging the comparison value table, and thus only one comparator is required. Therefore, even if the word length of the PID is long, little change to the circuit is required.

Furthermore, according to the present invention, input packet data remains within the FIFO memory until it is determined whether the input packet data is desired. The packet data is used if it is determined to be desired packet data, and is superseded if it is not determined to be desired packet data. Therefore, even if the position of the PID is variable within the packet data, filtering may be implemented without the need to change the circuit.

While preferred embodiments of the invention have been described using specific terms, such description is for illustrative purpose only, and it is to be understood that changes and variations may be made without departing from the spirit or scope of the following claims.

What is claimed is:

1. A PID (Packet Identifier) filter circuit for filtering packet data based on PIDs (Packet Identifiers) included within input packets, comprising:

a comparison value table for storing therein comparison values representing PIDs to be detected; and a comparator for determining a position of a PID within an input packet, and for reading words of a comparison value successively from the comparison value table and comparing successive words of the PID of said input packet with said successive words of the comparison value to determine whether the PID of the input packet matches the comparison value.

2. A PID filter circuit as claimed in claim 1, further comprising a FIFO (First-in, First-out) memory for storing input packets received by the filter circuit, wherein the FIFO memory does not execute a read operation for a packet stored therein until a PID of the packet stored therein data is determined to match a comparison value from said comparison value table, and wherein, if said packet stored in the FIFO memory is determined not to match said comparison value from said comparison value table, said PID filter circuit causes said packet to be cleared from the FIFO memory.

3. A PID filter circuit as claimed in claim 1, further comprising a FIFO (First-in, First-out) memory for storing input packets, wherein said FIFO memory does not execute a read operation while the comparator is executing a comparison operation.

4. A PID filter circuit as claimed in claim 1, further comprising:

first and second FIFO (First-in First-out) memories for storing said input packets;

a first switch for inputting input packets to one of said first and said second FIFO memories; and a second switch for selecting output from a one of said first and second FIFO memories not selected by said first switch, wherein, when an input packet stored in one of said first and second FIFO memories is determined to be a desired packet based on the result of a comparison operation in said comparator, the PID filter circuit causes said first and second switches to be set such that said second switch is connected to said one of said first and second FIFO memories so as to provide said desired packet as an output packet.

5. A PID filter circuit as claimed in claim 2, wherein said FIFO memory comprises:

a dual port memory for storing input packets;

a write pointer for indicating a write address within said dual port memory;

a read pointer for indicating a read address within said dual port memory;

a write control section for controlling write operations of said dual port memory such that the value of said write pointer is incremented when a write operation is performed, and such that when an input packet stored in the dual port memory is determined not to be a desired input packet based on the result of a comparison operation of said comparator, the value of said write pointer is decremented in accordance with a quantity of the not desired packet already stored in the dual port memory; and a read control section for controlling read operations of said dual port memory such that a read operation causes a value of said read pointer to be incremented, and such that read operations are not performed when a quantity of unread data within said dual port memory is less than a length of a packet.

6. A PID filter circuit as claimed in claim 5, further comprising a subtracter for calculating a difference between a value of said write pointer and a value of said read pointer and providing said difference to said read control section.

7. A FIFO circuit including a FIFO memory for storing input data, said FIFO memory comprising:

a dual port memory for storing said input data;

a write pointer for indicating a write address within said dual port memory;

a read pointer for indicating a read address within said dual port memory;

a write control section for controlling write operations of said dual port memory such that the value of said write pointer is incremented when a write operation is performed, and such that when there is received a control signal indicating that input data stored in the dual port memory is not desired data, the value of said write pointer is decremented in accordance with a quantity of the not desired input data already stored in the dual port memory; and a read control section for controlling read operations of said dual port memory such that a read operation causes a value of said read pointer to be incremented, and such that read operations are not performed when a quantity of unread input data stored in the dual port memory is less than predetermined amount.

8. A FIFO circuit as claimed in claim 7, further comprising a subtracter for calculating a difference between a value of said write pointer and a value of said read pointer and providing said difference to said read control section as representing an unread data quantity within said dual port memory.

* * * * *